Figure 4:
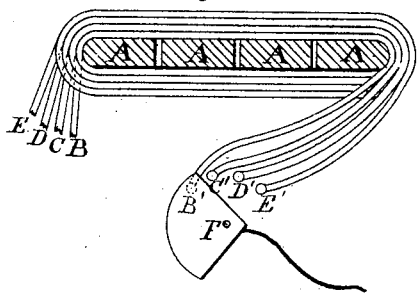

(No Model.) 2 Sheets—Sheet 1.
C. G. CURTIS & F. B. CROCKER.
ELECTRIC LOCOMOTIVE.
No. 271,042. Patented Jan. 23, 1883.
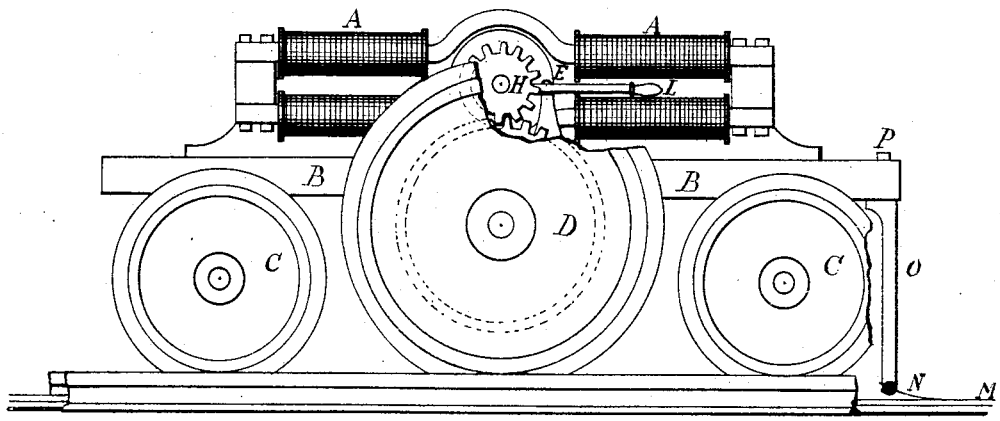
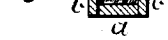
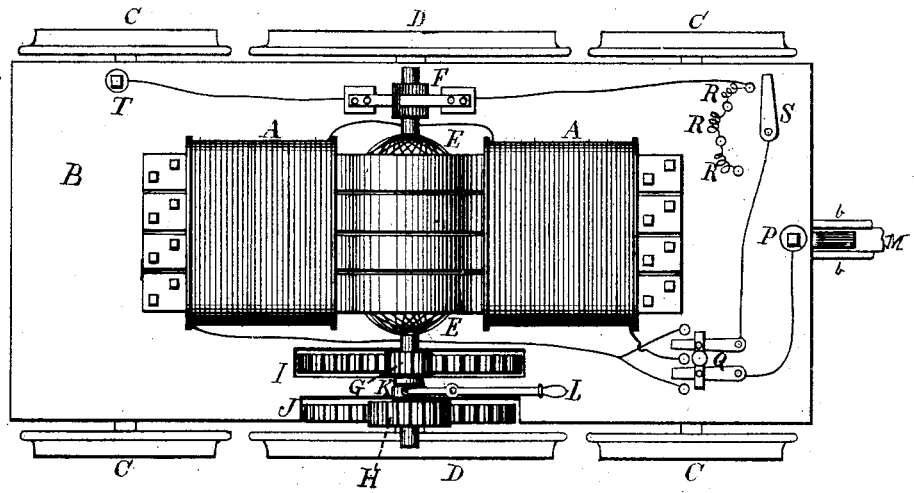
WITNESSES
Schuyler S. Wheeler
Henry H. Crocker Jr.
INVENTORS
Francis B. Crocker
Chas. G. Curtis
by Curtis & Crocker
Attys
N. PETERS. Photo-Lithographer. Washington, D. C.

(No Model.) 2 Sheets—Sheet 2.

C. G. CURTIS & F. B. CROCKER.
ELECTRIC LOCOMOTIVE.

No. 271,042. Patented Jan. 23, 1883.

WITNESSES
Schuyler S. Wheeler.
Henry F. Crockert

INVENTORS
Francis B. Crocker
Chas. G. Curtis
by Curtis & Crocker

UNITED STATES PATENT OFFICE.

CHARLES G. CURTIS AND FRANCIS B. CROCKER, OF NEW YORK, N. Y.

ELECTRIC LOCOMOTIVE.

SPECIFICATION forming part of Letters Patent No. 271,042, dated January 23, 1883.

Application filed March 23, 1882. (No model.)

*To all whom it may concern:*

Be it known that we, CHARLES G. CURTIS and FRANCIS B. CROCKER, citizens of the United States, residing at New York, in the county and State of New York, have invented new and useful Improvements in Electric Locomotives, of which the following is a specification.

Our invention relates to electric motors which are actuated by electric currents supplied to them from unlimited sources of electrical energy—that is to say, from sources from which currents of greater or less strength may be derived according to the amount of power which it is desired to have developed by the motor. It is well known that if the electro-motive force of such an electric current—or, more properly speaking, the electro-motive force of the electric generator—remain constant the strength of the current or the amount of force in the form of electrical energy which flows through the motor is determined by the electrical resistance of the circuit (including the resistance of the motor) in which the motor is placed, and may be increased or diminished at pleasure by altering the said resistance; and since the power developed by the motor depends upon the strength of current flowing through it, advantage has heretofore been taken of this fact to regulate the power of motors by cutting into or out of the circuit more or less auxiliary resistance. Such a method is objectionable and materially interferes with the efficiency of the apparatus, for the reason that whenever any resistance external to the motor is introduced into the circuit electrical energy is absorbed by it and tranformed into heat without producing any useful electro-dynamic effect in the motor, and when this external or "dead" resistance, which is thus introduced for the purpose of increasing the resistance of the circuit, becomes anything like as great as the resistance of the motor itself, as it must become in order to reduce the power of the motor materially, it absorbs a very considerable portion of the total energy in the circuit, and to that extent impairs the efficiency of the system.

Our invention is designed to secure the desired variation in the power or speed of the motor without entailing this loss of efficiency, not by varying the electrical resistance of the circuit external to the motor, but by altering the resistance of that part of the circuit which is comprised in the motor, and which produces the useful electro-dynamic effect therein, by which means the strength of current flowing through the motor may be regulated so as to secure the desired power or speed without the introduction into the circuit of any dead-resistance, which absorbs the electrical energy without adding anything to the power of the motor, the greater part of the resistance in circuit being by our invention confined to the electro-magnetic coils of the motor, in which the electrical is transformed into mechanical energy, and where while the motor is working it occasions comparatively no loss.

Our invention consists in winding the coils of the field-magnets or the coils of the armature of the electric motor, or both, each with two or more independent wires or conductors, and connecting the ends of these wires to a circuit-controlling switch, by means of which one, two, three, or more of the wires may be readily connected in circuit in "multiple arc," or in connecting the free ends of the said wires to a circuit-controlling switch of a different construction, by means of which the said wires may be readily connected and the actuating-current made to pass through them, either in multiple arc or in "groups" or "in series," thereby rendering it possible to regulate the electrical resistance of the circuit, and consequently the intensity of the current flowing through the motor, without the introduction into the circuit of any injurious dead-resistance, as more particularly hereinafter set forth.

The invention is especially applicable to the motors of electric locomotives, which require their power to be capable of great reduction after having got under way, and which would otherwise involve the use of a large amount of dead-resistance in circuit during the greater portion of the time, and in the accompanying drawings the invention is shown as applied to such motors.

Figure 5:
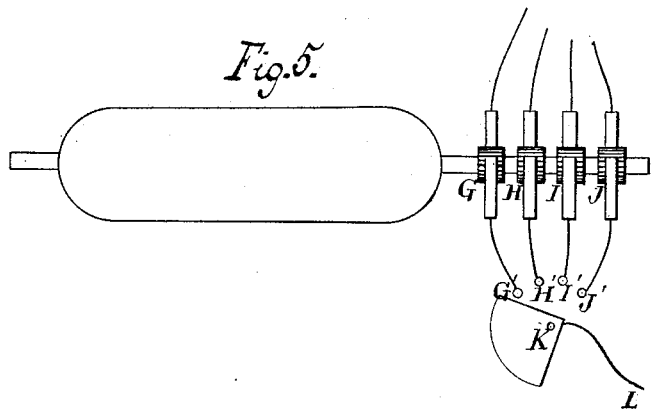
Figure 6:
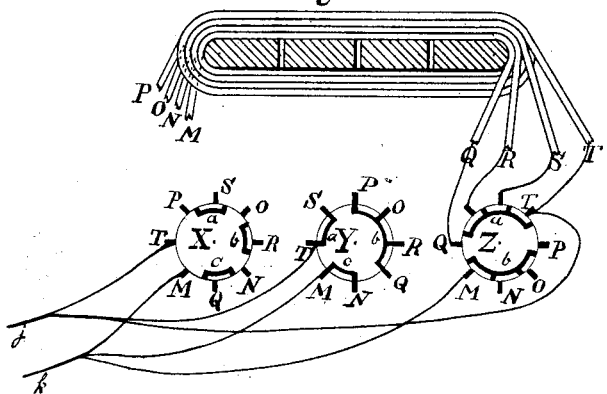

Figure 1 is a side view in elevation, showing an electric motor according to our invention, as applied to an electric locomotive. Fig. 2 is a plan of the same. Fig. 3 is a cross-section of the insulated conductor which we employ to convey the current to the locomotive. Figs. 4 and 6 are transverse sections of the field-magnets, showing the multiple winding according to our invention; and Fig. 5 is an elevation of the armature similarly constructed for multiple connections.

In Figs. 1 and 2, A A represent the field-magnets of the electric motor, which may be of any form suitably mounted upon the platform or frame B, which is supported in the usual manner, partly upon flanged wheels C C and partly upon the driving-wheels D, adapted to run upon a track.

E is the armature of the motor, the axle of which carries on one end the commutator F and on the other two pinions, G and H, which gear respectively into the spur-wheels I and J, fixed to the axle of the driving-wheels D, and which pinions G and H are loose upon their shaft; but either, as desired, may be made to rotate with the shaft by the clutch K, operated by the lever L. The pinion G being smaller than the pinion H, the relative speed of the motor with respect to the driving-wheels, and consequently the speed of the locomotive, may be changed by means of the friction-clutch K. The motive current of electricity is taken from the metallic conductor M by the brush N or by any convenient means of connection, whence it passes up through the arm O and bolt P to the switch Q, by means of which the polarity of the field-magnets A A may be changed by reversing the direction in which the current flows through their coils. The arrangement of this switch and mode of operation are clearly indicated in the drawings. From the switch Q the current flows to the switch S, the function of which is to introduce resistance R R R into the circuit, according to the method heretofore employed for varying the strength of current flowing through the motor, and thence by the commutator F through the armature E, from which it passes to the bolt T and wheels C C to both tracks combined, which act as a return-conductor.

The conductor which we prefer to employ for conveying the driving-current, but which we do not claim as our invention, of which a cross-section is shown in Fig. 3, consists of a metallic strip, rail, or wire, M, laid in an insulating trough or channel, $b\ a\ b$, the sides of which, $b\ b$, extend above the surface and prevent anything from coming in contact with the conductor M which might offer a path for the leakage of the current.

Our two methods of winding the field-magnets and armature of the electromotor are shown, the first in Figs. 4 and 5 and the second in Fig. 6.

In Fig. 4, A A A A are sections of the cores of the field-magnet; B C D E, four separate insulated wires, which are wound upon the field-magnets, one upon another, in such a manner that the wire B forms the first or inner layer or layers, the wire C the next layer or layers, D the next, and so on, the layers extending, as usual, the whole length of the coils, and the separate wires being respectively connected at one end to the points $B'\ C'\ D'\ E'$ of the switch F and at the other to the corresponding circuits of the other field-magnet coils. By turning the metallic sector or switch F, which is in electrical connection with one main conductor, so as to connect it with one, two, three, or all of the terminals of the field-magnet coils at once, the driving-current may be made to pass through one or more of the circuits of the motor in multiple arc, and so made to produce a stronger or weaker effect, as desired. Since the supply of current from the main conductors is practically unlimited, and since the amount of current which passes through each motor depends solely upon the resistance of that motor, the effect of adding another of the multiple circuits to one already in connection with the main conductors is practically to double the power of the motor by doubling the amount of current which passes through it. This holds true for any number of circuits, and therefore when all four circuits are connected to the main conductors in multiple arc the motive power is quadrupled.

The reason for winding on only one circuit, B, at a time, instead of simply winding the four circuits all together, is to have the first circuit wound the nearest to, the second farther, the next still farther, and so on, from the iron core, in order to bring the current into the closest possible proximity to the core, and thereby secure the maximum electro-magnetic effect, and hence the highest efficiency when less than all of the coils are in circuit. If, instead of separately winding the four circuits in this way, we were to wind them altogether, we should have a very bad disposition of the circuits when the current is only sent through one, two, or any number less than all of them, because the wire or wires through which the current passes and which produce the useful effect are separated and kept at a distance from the core of the magnet by wires which are lying idle, whereas, if each of the four circuits form an entire layer or two or more consecutive layers of the coil, and whenever we use less than all the circuits to excite the magnets we employ those nearest to the cores, we shall then always have the wires through which the current passes producing their maximum electro-magnetic effect.

The effect produced by one convolution of wire being inversely proportional to the square of the distance of the wire from the iron core, equal effects may be obtained from all the circuits by making them consist of more convolutions the farther they are removed from the core, and at the same time keeping their resistances equal, or, what is the same thing, making the inner circuits of greater resistance, so as to neutralize the increased effect due to their greater proximity to the iron core.

It is obvious that any number of circuits may be used instead of four for the purpose just described, and that the circuits could all be wound together instead of in layers.

Fig. 5 shows the application of the same idea to the armature of the electromotor, in which the winding of the separate circuits is not shown, but is similar to that already described, the first circuit being wound nearest the core, the second farther from it, and so on, and being respectively connected to the strips or points of the commutators G H I J in the usual manner, precisely as though the other circuits did not exist. It is clear that by turning the switch K, which is electrically connected with one main conductor, one, two, three, or more of the armature-circuits may be connected in multiple arc, and so made to increase the range or scope of variation of the motive power, in addition to that derived from the similar arrangement of the field-magnets above described. After passing through the armature-circuits the current emerges by the commutator-brushes, and then passes to the field-magnet circuits, and then to the other main conductor.

Fig. 6 shows another method of connecting the several separate circuits with which the field-magnets are wound. The circuits themselves are wound upon the magnets precisely as in Fig. 4, described above; but instead of varying the power of the motor by sending the actuating-current through one, two, three, or all of the circuits in multiple arc, as we do in the method shown in Fig. 4, we secure this variation of power by connecting the circuits in series, in multiple arc, or in combinations of series and multiple arc, generally called "groups."

In Fig. 6 we have represented a magnet wound with four circuits, and in such a case three arrangements are possible: First, the four circuits may be connected in series, thus forming a single continuous conductor whose length is equal to the sum of the four circuits; second, they may be connected in two sets or groups of two each, the current passing first through one pair and then through the other, the result being that we have a double conductor with twice the length of one of the circuits; third, the four circuits may be connected in multiple arc, thus forming a quadruple conductor having the length of one circuit.

It is necessary, in making the connection for these arrangements, to be careful to have the current alway pass around the magnet in the same direction, and this we accomplish by means of the three switches X, Y, and Z, each of which consists of a revolving disk, as X Y, &c., of insulating material, upon which are set metallic strips a b c, &c., (shown in black,) arranged to make the proper connections between the eight metallic switch-points T P S R, &c., set around the disk, which points are connected respectively to the eight terminals of the field-magnet circuits designated by the same letters, the wires connecting the switch-points to the corresponding terminals of the field-magnet circuits being only shown in the case of the switch Z, since the wires to make these connections for the switches X and Y also would have to cross each other so as to greatly confuse the drawings.

We have seen above that it is possible to arrange four circuits in three ways.

First. To connect them in series, which may be done by turning the disk X so as to connect the points Q with N, O with R, and S with P, in which case the current enters through the wire j T, thence (remembering that the point T of the switch is permanently connected with the terminal T of the outer field-magnet circuit, and that each of the other twenty-three points of the three switches X, Y, and Z are connected, as before stated, with the terminals designated by the same letters) through the outer circuit, T P, of the field-magnet, and since P, as we have seen, is connected to S in the switch X, the current then flows through the circuit S O, and, O being connected to R and N to Q, it traverses in succession the remaining circuits, R N and Q M, passing out to the main conductor k through the wire M, leading from the switch X.

Second. It is possible to connect the four circuits in two sets of two each. This is accomplished by turning the switch Y into the position shown in the drawings. The current will then flow from the main conductor j to the points T and S of the switch Y, where it will split and pass through the two outer circuits, T P and S O, of the field-magnet. At the same time the other extremities, O and P, of these circuits being connected by the switch Y, as shown, to the terminals R and Q, the current consequently divides again and traverses the two inner circuits, R N and Q M, finally passing out to the main conductor k from the points N and M of the switch Y.

Third. It is possible to connect the four wires in multiple arc, which may be done by turning the switch Z so as to connect together the points Q, R, S, and T, and also the points P, O, N, and M, in which case the path of the current is as follows: Entering from the main conductor j at T, it divides, one-quarter thereof flowing through each of the four circuits Q M, R N, S O, and T P, thence back to the switch Z through the points M N O P to the return-conductor k.

The second method of connecting the multiple circuits composing the field-magnet coils may obviously be also applied to the coils of the armature. By means of the first-described method of multiple winding it is possible to arrange any dynamo-electric machine so that the amount of electricity, or force in the form of electricity, generated by it may be increased or diminished at pleasure without changing the electro-motive force of the current produced.

Our invention may be applied to any form of electromotor or of dynamo-electric machine, whether locomotive or stationary; and it is obvious that the electric motor or dynamo-electric machine may be wound multiply, as we have explained, with any number of separate circuits or conductors instead of with four circuits, as shown, and that various combinations of these conductors in multiple arc, in groups, and in series connection may be made by means of switches similar to those herein shown.

What we claim as our invention, and desire to secure by Letters Patent, is—

1. An electric motor having its field-magnet cores or its armature-core, or both, each wound with two or more separately-insulated wires or conductors, substantially as described, said conductors having one set of their free ends electrically connected together and to one of the current-supplying conductors, and their other free ends separately connected to a circuit-controlling switch, whereby one, two, three, or more of said field-magnet or armature conductors may be connected to the other current-supplying conductor in multiple arc, substantially as and for the purpose set forth.

2. An electric motor having its field-magnet cores or its armature core, or both, each wound with two or more separately-insulated wires or conductors, so that each conductor forms one or more layers, substantially as described, said conductors having one set of their free ends electrically connected together and to one of the current-supplying conductors, and their other free ends separately connected to a circuit-controlling switch, whereby one, two, three, or more of said field-magnet or armature conductors may be connected to the other current-supplying conductor in multiple arc in the order of their proximity to the core, substantially as and for the purpose set forth.

3. An electric motor having its field-magnet cores or its armature core, or both, each wound with two or more separately-insulated wires or conductors, in combination with the circuit-controlling switches X, Y, and Z, substantially as described, by means of which said wires may be instantly connected with the current-supplying conductors, either in series or in groups, or in multiple arc, by a single movement of one of the said switches, substantially as and for the purpose set forth.

CHARLES G. CURTIS.
FRANCIS B. CROCKER.

Witnesses:
HENRY H. CROCKER, Jr.,
SCHUYLER S. WHEELER.